United States Patent [19]

Abraham

[11] Patent Number: 4,544,007
[45] Date of Patent: Oct. 1, 1985

[54] VEHICLE GASOLINE TANK CAP FOR GASOLINE PUMP FLOW CONTROL

[76] Inventor: Samuel R. Abraham, 3521 N.W. 54, #291, Oklahoma City, Okla. 73112

[21] Appl. No.: 560,618

[22] Filed: Dec. 12, 1983

[51] Int. Cl.⁴ .............................................. B65D 51/24
[52] U.S. Cl. ............................ 141/392; 220/DIG. 33
[58] Field of Search .......................... 141/1, 209, 392; 220/DIG. 33; 222/566

[56] References Cited

U.S. PATENT DOCUMENTS

| | | | |
|---|---|---|---|
| 3,113,599 | 12/1963 | Trotter | 141/392 |
| 4,142,756 | 3/1979 | Henning et al. | 220/DIG. 33 |
| 4,236,552 | 12/1980 | Rayboy | 220/DIG. 33 |
| 4,278,116 | 7/1981 | Opp | 141/392 |

Primary Examiner—Stephen Marcus
Assistant Examiner—Mark Thronson
Attorney, Agent, or Firm—Robert K. Rhea

[57] ABSTRACT

The filler neck gas cap of a vehicle owner is utilized as a prop for maintaining the lever of a gasoline pump dispensing nozzle in open position without the necessity of manual operation.

In one embodiment, resilient material surrounds or is secured to diametrically opposite positions of the periphery of the gas cap.

In another embodiment, resilient material is secured to axially opposite ends of the gas cap. The resilient material increases the coefficient of friction between the gas cap and nozzle lever and its guard when interposed therebetween while the lever is in nozzle open position.

1 Claim, 11 Drawing Figures

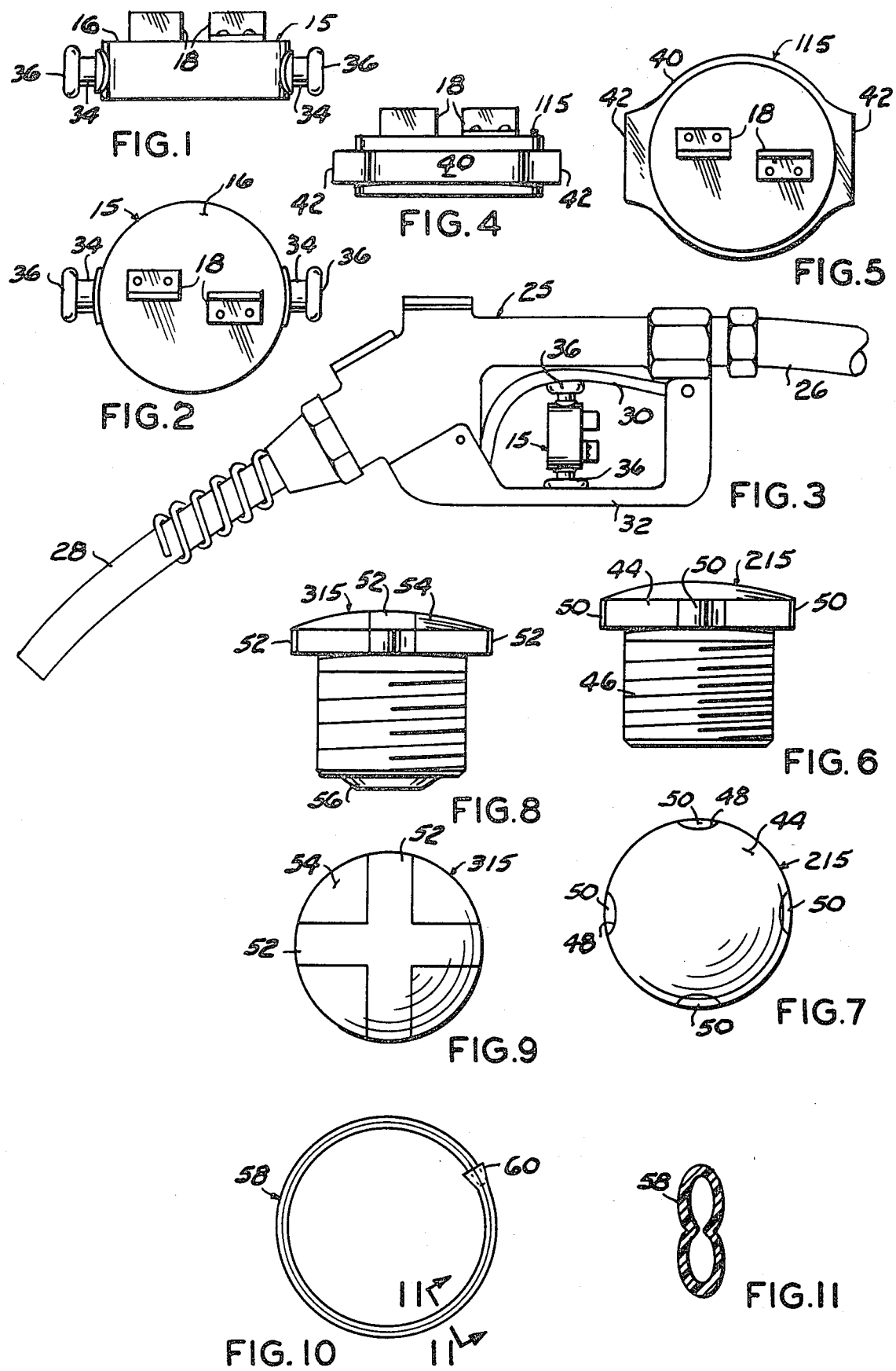

VEHICLE GASOLINE TANK CAP FOR GASOLINE PUMP FLOW CONTROL

BACKGROUND OF THE INVENTION

1. Field of the invention

The present invention relates to gasoline tank caps and more particularly to a resilient attachment therefor enabling the cap to be used as an aid in dispensing gasoline from a gasoline pump nozzle.

At present most vehicle gasoline service stations provide self-service gasoline pumps which, for economical reasons, have become quite popular, however, because of the volatile properties of gasoline considerable gasoline vapors are present in the vicinity of the normally hand held gasoline pump dispensing nozzle during the time gasoline is being dispensed from the pump into the vehicle gas tank. The gasoline vapors are obnoxious to most individuals as well as possibly presenting a potential health hazard from breathing the vapors thereof. This is particularly true of those individuals who suffer from emphysema and/or asthma in which even one breath of gasoline vapors will trigger an asthmatic attack. Some self-service gasoline pump nozzles are equipped with a tank filled back pressure released latch which permits the vehicle owner to stand laterally or upwind from the vapors while the tank is filling, however, many municipalities have an ordinance against use of the latch by the general public.

It is, therefore, highly desirable that some means be provided wherein gasoline vapors from a pump dispensing nozzle are minimized in contacting a vehicle owner while filling his tank. This invention provides such a device.

2. Description of the Prior Art

Prior patents generally disclose pocket size generally planar metallic members having opposing surfaces for wedging the device between a gasoline pump nozzle dispensing lever and a portion of the nozzle bracket or lever guard to maintain the lever in fluid dispensing position. U.S. Pat. No. 4,278,116 is a good example of such prior art devices having a plurality of wedge-shape shoulders and opposing parallel surface portions on its periphery adapted to be interposed between the gasoline nozzle dispensing lever and its guard for dispensing gasoline at a predetermined rate. While devices of this nature, as disclosed by the prior art, have generally been satisfactory they have not come into general use principally, it is believed, for the reason they are not readily available for use when needed, being easily misplaced either in the vehicle, left at the owner's residence or in the possession of another family member.

This invention is distinctive over the above and other similar patents by equipping the gas tank cap with external resilient attachments for use as a prop or support for maintaining a gasoline dispensing nozzle in opened position, the gasoline tank cap obviously being readily available each time the tank is to be filled.

SUMMARY OF THE INVENTION

One feature common to all of the gasoline pump dispensing nozzles of which I am aware comprise a variable position valve opening and closing lever protected by a lever guard in substantially gun trigger fashion in which the lever is manually moved in one direction for opening the valve and is spring biased closed when released. The spacing between the lever and its guard, when in valve open position, is sufficient to admit most vehicle gasoline tank caps either diametrically across its periphery or longitudinally between its ends. The conventional gasoline tank cap of each vehicle is either manufactured or retrofitted with diametrically opposed resilient members on its periphery which may increase the diameter of the tank cap, as desired, or be embedded therein accordance with the diameter of the respective cap. The resilient members may be formed as a ring of the resilient material which may have diametrically opposite thickened portions or may be an endless ring or tube. In the embedded version sections of the resilient material are diametrically secured oppositely to the top portion of the gas cap or may extend across the outer end thereof with a companion resilient cushion axially attached to the inward end of the cap.

The principal object of this invention is to equip a gasoline tank cap with a resilient ring or lugs for inserting and removably maintaining the gas cap between a gasoline tank filler nozzle lever and the nozzle lever guard while dispensing gasoline into a vehicle tank and permit the operator to avoid gasoline vapors.

BRIEF DESCRIPTION OF THE DRAWINGS

FIG. 1 is a side elevational view of a gas tank cap illustrating one embodiment of the invention;

FIG. 2 is a top view of FIG. 1;

FIG. 3 is a fragmentary side elevational view, to a different scale, of a conventional gasoline pump dispensing nozzle having the device of FIG. 1 in operative position thereon;

FIG. 4 is a side elevational view of another embodiment of the gas cap;

FIG. 5 is a top view of FIG. 4;

FIG. 6 is a side elevational view of another embodiment of the gas cap;

FIG. 7 is a top view of FIG. 6;

FIG. 8 is a side elevational view of another embodiment of the gas cap;

FIG. 9 is a top view of FIG. 8;

FIG. 10 is a plan view of a flexible tube for surrounding the periphery of a gas cap; and, FIG. 11 is a vertical cross sectional view, to an enlarged scale, taken substantially along the line 11—11 of FIG. 10.

DESCRIPTION OF THE PREFERRED EMBODIMENTS

Like characters of reference designate like parts in those figures of the drawings in which they occur.

In the drawings:

The reference numeral 15 indicates a conventional gas cap modified in accordance with the invention. The gas cap 15 is sleeve-like having a relatively short length when compared to its diameter and having one closed end 16 forming the top of the gas cap. The gas cap is dimensioned to fit over the open end of a vehicle gasoline reservoir or tank filler neck, not shown, and is provided on its inner surface with lugs or prongs cooperatively engaging lugs or prongs similarly, not shown, on the gas tank filler neck for securing a cap 15 thereon and permitting removal of the cap relative to the filler neck. Upstanding lips or ears 18 on the cap top facilitate manual installation or removal of the gas cap.

The numeral 25 indicates a gasoline pump dispensing nozzle connected with a gasoline pump, not shown, by a length of flexible hose 26 and includes a valve mechanism, not shown, between the hose and dispensing nozzle 28 opened and closed by a manually operated lever 30 longitudinally spanned by a lever guard 32. Manual movement of the lever away from its guard 32 opens the nozzle valve mechanism and a spring means contained by the nozzle mechanism moves the lever toward its guard 32 to close the valve mechanism upon release of the lever.

The gas cap 15 may be diametrically interposed between the lever 30 and its guard 32 to maintain the valve mechanism in open position, however, metal to metal contact of the cap with the lever and its guard results in a low coefficient of sliding friction and displacement of the cap. Further, many gas caps 15 are diametrically too small to hold the valve mechanism substantially in a full open position. The gas cap 15 is modified by attaching a diametrically opposite pair of tubular or rod-like extensions 34 thereto with the outer end of each extension 34 having a pad 36 thereon, preferably inert resilient material, so that the diametric distance between the pads is substantially equal to the distance between the lever 30 and its guard 32 when the lever is in full open position to hold the valve mechanism open, as illustrated by FIG. 3.

In FIG. 4, the numeral 115 indicates a substantially identical gas cap modified for use with the nozzle 25 by placing an endless ring 40, similarly formed from inert resilient material, around its outermost periphery. Diametrically opposite portions of the ring are thickened to form a desired diametric distance thereacross and present opposing parallel surfaces 42 which frictionally contact the lever 30 and its guard 32, respectively, when the gas cap 115 is interposed therebetween.

In FIG. 6, the numeral 215 illustrates another embodiment of the invention in which the gas cap includes a top portion 44 and an externally threaded stem portion 46 of smaller diameter dimensioned to be received by a gas tank filler neck. The top portion 44 is conventionally provided with diametrically opposed hand grip recesses or indentations 48 extending through an arc of its periphery which are respectively filled by inserts 50 of the inert resilient material for the purpose of similarly interposing the periphery of the cap top portion 44 in gas nozzle lever propped open position.

Another modification of the gas cap is indicated at 315 (FIGS. 8 and 9) wherein a gas cap, similar to the gas cap described for FIGS. 6 and 7, is provided with intersecting inert resilient material strips 52 extending diametrically in crossed relation over its outer end surface or top and transversely across the periphery of the cap top portion 54. In this embodiment, the other or inner end of the gas cap has a cushion 56 of the inert resilient material axially secured thereto which permits the gas cap 315 to maintain the nozzle lever 30 in open position by interposing the periphery of its top portion thereunder or longitudinally disposing the gas cap 315 between the lever and its guard 32.

FIGS. 10 and 11 illustrate a length of flexible tubing 58 similarly formed from inert resilient material which is substantially figure 8-shaped in transverse section (FIG. 11). One end of the tube is flared, as at 60, for receiving, in frictional gripping relation, the opposite end of the tube to form the endless ring. This endless ring 58 may be installed by the vehicle owner on the gas cap of existing vehicles for use in propping the nozzle lever 30 in gasoline dispensing position assuming, of course, that the diameter of the existing gas cap is complemental with the spacing between the open position of the dispensing nozzle lever and its guard.

Obviously the invention is susceptible to changes or alterations without defeating its practicability. Therefore, I do not wish to be confined to the preferred embodiment shown in the drawings and described herein.

I claim:

1. In a gasoline pump elongated dispensing valve nozzle having a laterally spaced longitudinally extending lever guard and having a variable position lever movable toward and away from the lever guard for dispensing and interrupting gasoline flow from the nozzle in combination with a vehicle gasoline tank filler neck gas cap having circular outer and inner end portions and having a diametric or axial dimension freely received between said lever and the lever guard when the lever is moved toward gasoline dispensing position, the improvement comprising:

resilient material means having a surface providing a relatively high coefficient of sliding friction, when compared with metallic surfaces, including at least one strip extending transversely across the outer end portion of said gas cap; and, a cushion axially overlying the inward end portion of of said gas cap for maintaining said lever in gasoline dispensing position by increasing the coefficent of sliding friction between said gas cap and said lever and the lever guard.

* * * * *